US012565876B2

(12) United States Patent
Wang et al.

(10) Patent No.: US 12,565,876 B2
(45) Date of Patent: Mar. 3, 2026

(54) TOWER DRUM SECTION, TOWER, WIND TURBINE, MOLD, AND FORMING METHOD

(71) Applicant: BEIJING TIANSHAN HI-TECH WIND POWER EQUIPMENT CO., LTD., Beijing (CN)

(72) Inventors: Peixian Wang, Beijing (CN); Ruilong Xu, Beijing (CN); Ou Cong, Beijing (CN)

(73) Assignee: BEIJING TIANSHAN HI-TECH WIND POWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/695,955

(22) PCT Filed: Dec. 27, 2021

(86) PCT No.: PCT/CN2021/141691
§ 371 (c)(1),
(2) Date: Mar. 27, 2024

(87) PCT Pub. No.: WO2023/045157
PCT Pub. Date: Mar. 30, 2023

(65) Prior Publication Data
US 2024/0392751 A1 Nov. 28, 2024

(30) Foreign Application Priority Data
Sep. 27, 2021 (CN) .......................... 202111137327.X

(51) Int. Cl.
*F03D 13/20* (2016.01)
(52) U.S. Cl.
CPC ......... *F03D 13/205* (2023.08); *F03D 13/204* (2023.08); *F05B 2260/301* (2013.01)

(58) Field of Classification Search
CPC ....... F03D 13/205; F03D 13/204; B28B 1/14; F05B 2260/301
See application file for complete search history.

(56) References Cited

U.S. PATENT DOCUMENTS 6,089,304 A * 7/2000 Mullet ................ E05D 13/1261
160/209
8,272,173 B2 * 9/2012 Jakubowski ............ E02D 27/42
52/223.13

(Continued)

FOREIGN PATENT DOCUMENTS

CN 203175133 U * 9/2013
CN 106438213 A * 2/2017 ............. C04B 28/04

(Continued)

OTHER PUBLICATIONS

Translation of CN 106438213 (Year: 2017).*

(Continued)

*Primary Examiner* — Andrew J Triggs
(74) *Attorney, Agent, or Firm* — Bayes PLLC

(57) ABSTRACT

A tower drum section includes: a drum section base, including two or more tower drum pieces successively distributed along its circumferential direction; and a connecting assembly. The connecting assembly includes a first connecting member and a second connecting member; the first connecting member is located inside one of the two adjacent tower drum pieces, and the second connecting member is at least partially located inside the other of the two adjacent tower drum pieces; the first connecting member includes an adapter portion and an anchoring portion. A tower includes two or more tower drum sections connected to each other. A wind turbine includes the tower. Disclosed are a mold for manufacturing the tower drum section and a method for manufacturing the tower drum section using the mold.

20 Claims, 8 Drawing Sheets

100

(56)                    References Cited

U.S. PATENT DOCUMENTS

| | | | | | |
|---|---|---|---|---|---|
| 9,163,613 | B2 * | 10/2015 | Martínez | ................ | F03D 13/20 |
| 10,538,936 | B2 * | 1/2020 | Knitl | ..................... | F03D 13/20 |
| 12,049,733 | B2 * | 7/2024 | Rogers | ................... | F16B 13/12 |
| 2024/0209651 | A1 * | 6/2024 | Lebon | ................... | F03D 13/20 |
| 2024/0392751 | A1 * | 11/2024 | Wang | ................... | F03D 13/205 |

FOREIGN PATENT DOCUMENTS

| | | | | | |
|---|---|---|---|---|---|
| CN | 106438214 | A | 2/2017 | | |
| CN | 106626008 | A | 5/2017 | | |
| CN | 206221163 | U | 6/2017 | | |
| CN | 108104567 | A | 6/2018 | | |
| CN | 108167125 | A | 6/2018 | | |
| CN | 108266330 | A | 7/2018 | | |
| CN | 209228539 | U | 8/2019 | | |
| CN | 210714941 | U | 6/2020 | | |
| CN | 112096573 | A | 12/2020 | | |
| CN | 112483328 | A | 3/2021 | | |
| CN | 113309672 | A | 8/2021 | | |
| CN | 106438213 | B * | 3/2022 | ............. | C04B 28/04 |
| EP | 2253782 | A1 | 11/2010 | | |
| EP | 3428447 | A1 | 1/2019 | | |
| JP | 2016529134 | A * | 9/2016 | ............. | F03D 13/20 |
| WO | WO-2020239587 | A1 * | 12/2020 | ............. | E04H 12/12 |

OTHER PUBLICATIONS

International Search Report and Written Opinion in related PCT Application No. PCT/CN2021/141691 dated Mar. 16, 2022 (15 pages).

Extended European Search Report in related European Application No. 21958267.3 dated Dec. 2, 2024 (9 pages).

Office Action in related Chinese Application No. 202111137327.X dated Mar. 22, 2025 (15 pages).

Office Action in related Chinese Application No. 202111137327.X dated Sep. 29, 2025 (14 pages).

* cited by examiner

1

100

100

100

212

22

231                                              221

23

232          233          231

TOWER DRUM SECTION, TOWER, WIND TURBINE, MOLD, AND FORMING METHOD

CROSS-REFERENCE TO RELATED APPLICATIONS

The present application is a national phase of International Application No. PCT/CN2021/141691, filed on Dec. 27, 2021, which claims priority to Chinese Patent Application No. 202111137327.X, filed on Sep. 27, 2021. The entire contents of each of the above-identified applications are expressly incorporated herein by reference.

TECHNICAL FIELD

The present application belongs to the field of wind power technology, and in particular, relates to a tower drum section, a tower, a wind turbine, a mold, and a forming method.

BACKGROUND

The development of the wind power industry has gradually entered the era of "parity", and how to provide a competitive cost of electricity has become a problem directly faced by various parts of current wind turbine. At present, the domestic wind power industry is developing towards the directions of "high tower and large capacity", and these two development directions both have put forward more urgent needs for reducing cost of a tower. At present, in a design stage of a steel-concrete tower, the production cost of the tower is reduced by continuous design optimization and process cost reduction, and in a lifting stage, more process improvements are required to further improve the efficiency and shorten the lifting time. Heights of steel-concrete towers have entered an era of more than 150 m. For the design of overall matching steel-concrete towers, higher proportions of the steel-concrete towers are required to meet stability requirements. Therefore, the heights of concrete towers are increasing.

Due to the weight and size characteristics of concrete structures, multiple annular sections and joints and assemblies between the multiple annular sections are inevitably. Therefore, how to implement rapid assembly of members between annular sections of a tower has become a technological focus. At present, the strength of assembling connection between the annular sections of the tower is low, which affects the safety performance of a tower drum section.

SUMMARY

Embodiments of the present application provide a tower drum section, a tower, a wind turbine, a mold, and a forming method. The tower drum section is conducive to transportation and has high safety performance.

In an aspect, a tower drum section is provided according to an embodiment of the present application, which includes: a drum section base, including two or more tower drum pieces successively distributed along its circumferential direction; and a connecting assembly, where in the circumferential direction, two adjacent tower drum pieces are connected by means of the connecting assembly, the connecting assembly includes a first connecting member and a second connecting member, the first connecting member is located inside one of the two adjacent tower drum pieces, the second connecting member is at least partially located inside the other of the two adjacent tower drum pieces, the first connecting member includes an adapter portion and an anchoring portion, the adapter portion is connected to the second connecting member, and the anchoring portion is connected to a side, facing away from the second connecting member, of the adapter portion.

According to one aspect of the embodiment of the present application, the anchoring portion is formed in a rod-like shape and includes a first end surface and a second end surface in its extension direction, the first end surface is disposed facing the adapter portion, and a maximum vertical distance between the first end surface and the second end surface is smaller than a dimension of the anchoring portion in length.

According to one aspect of the embodiment of the present application, the anchoring portion includes at least one bent region; the anchoring portion extends at least partially along a curve trace, and/or the anchoring portion extends at least partially along a broken line trace.

According to one aspect of the embodiment of the present application, the adapter portion and the anchoring portion are detachably connected to each other.

According to one aspect of the embodiment of the present application, the adapter portion includes a first adapter sleeve, and the anchoring portion extends at least partially into the first adapter sleeve and is threaded to the first adapter sleeve.

According to one aspect of the embodiment of the present application, the second connecting member includes a straight screw, the adapter portion includes a second adapter sleeve, and the straight screw protrudes along its length direction out of the tower drum piece and extends into the second adapter sleeve for being threaded to the second adapter sleeve.

According to one aspect of the embodiment of the present application, the tower drum piece where the straight screw is disposed, includes an operation notch on its inner wall surface, the length direction of the straight screw intersects an end surface in the circumferential direction of the tower drum piece where the straight screw is located, the tower drum piece is formed with a support surface facing the end surface at the operation notch, and the straight screw is at least partially located within the operation notch and presses against the support surface.

According to one aspect of the embodiment of the present application, the connecting assembly further includes a protective component, which includes a protective sleeve, the protective sleeve is at least partially located within the tower drum piece where the second connecting member is disposed, and the protective sleeve is disposed surrounding the straight screw.

According to one aspect of the embodiment of the present application, the protective component further includes a reinforcing plate and a plurality of reinforcing ribs, the reinforcing plate is disposed at an end, facing away from the first connecting member, of the protective sleeve in its axial direction and presses against the support surface, and the plurality of reinforcing ribs are spaced apart from each other on an outer circumference of the protective sleeve and connected to the reinforcing plate respectively.

According to one aspect of the embodiment of the present application, a plurality of connecting assemblies are provided and connected between the two adjacent tower drum pieces, and the plurality of connecting assemblies are spaced apart from each other in a height direction of the drum section base.

In another aspect, a tower is provided according to an embodiment of the present application, which includes the above-mentioned tower drum sections, where two or more tower drum sections are disposed coaxially and two adjacent tower drum sections are connected to each other.

In a further aspect, a wind turbine is provided according to an embodiment of the present application, which includes the above-mentioned tower.

In still another aspect, a mold is provided according to an embodiment of the present application, including: a mold base body, including two or more piece mold units and vertical end molds, where the two or more piece mold units are spaced apart from each other around a same axis, the vertical end molds are held between two adjacent piece mold units, the piece mold unit includes an inner mold and an outer mold that are opposite and a bottom mold, and the vertical end molds are abutted against and connected with each piece mold unit in the two adjacent piece mold units to form pouring cavities; and a connecting assembly, including a first connecting member and a second connecting member, where the first connecting member is located inside the pouring cavity of one of the two adjacent piece mold units, the second connecting member is at least partially located inside the pouring cavity of the other of the two adjacent piece mold units, the first connecting member includes an adapter portion and an anchoring portion, the second connecting member passes through the vertical end mold and is connected to the adapter portion, and the anchoring portion is connected to a side, facing away from the second connecting member, of the adapter portion.

According to another aspect of the embodiment of the present application, the inner mold of the piece mold unit where the second connecting member is disposed, includes a protrusion protruding in the direction of the outer mold, and the second connecting member extends at least partially into the protrusion.

In still another aspect, a method for forming a tower drum section is provided according to an embodiment of the present application, which includes: providing the above-mentioned mold; supporting at least one of the anchoring portion and the second connecting member to lock relative positions of the connecting assembly and the vertical end mold; pouring grout into the pouring cavity formed by each of the piece mold units and the vertical end molds; taking out the second connecting member after the grout solidifies to a predetermined state to separate the second connecting member from an integrity formed by the first connecting member, the mold base body, and the grout in the predetermined state; and separating the vertical end molds and each of the piece mold units from the grout solidifying in the corresponding pouring cavity after the grout completely solidifies.

According to another aspect of the embodiment of the present application, after pouring grout into the pouring cavity formed by each of the piece mold units and the vertical end molds and the grout solidifies to a predetermined state, and before separating the second connecting member from the first connecting member, the mold base body, and the grout in the predetermined state, the forming method further includes: screwing the second connecting member according to a predetermined speed.

According to the tower drum section, the tower, the wind turbine, the mold, and the forming method provided in the embodiments of the present application, the tower drum section includes the drum section base and the connecting assembly, the drum section base includes two or more tower drum pieces, and the tower drum section is formed in a split type, which can meet the transportation requirement for height limit and facilitate the transportation of the tower drum section. The connecting assembly includes the first connecting member and the second connecting member, the first connecting member is located inside one of two adjacent tower drum pieces, the second connecting member is at least partially located inside the other of the two adjacent tower drum pieces, and the adapter portion included in the first connecting member is connected to the second connecting member, so that the two adjacent tower drum pieces can be connected by means of the connecting assembly. In addition, the first connecting member further includes the anchoring portion, and the anchoring portion is connected to the side, facing away from the second connecting member, of the adapter portion.

BRIEF DESCRIPTION OF DRAWINGS

Features, advantages, and technical effects of exemplary embodiments of the present application will be described below with reference to the accompanying drawings.

Figure 1:
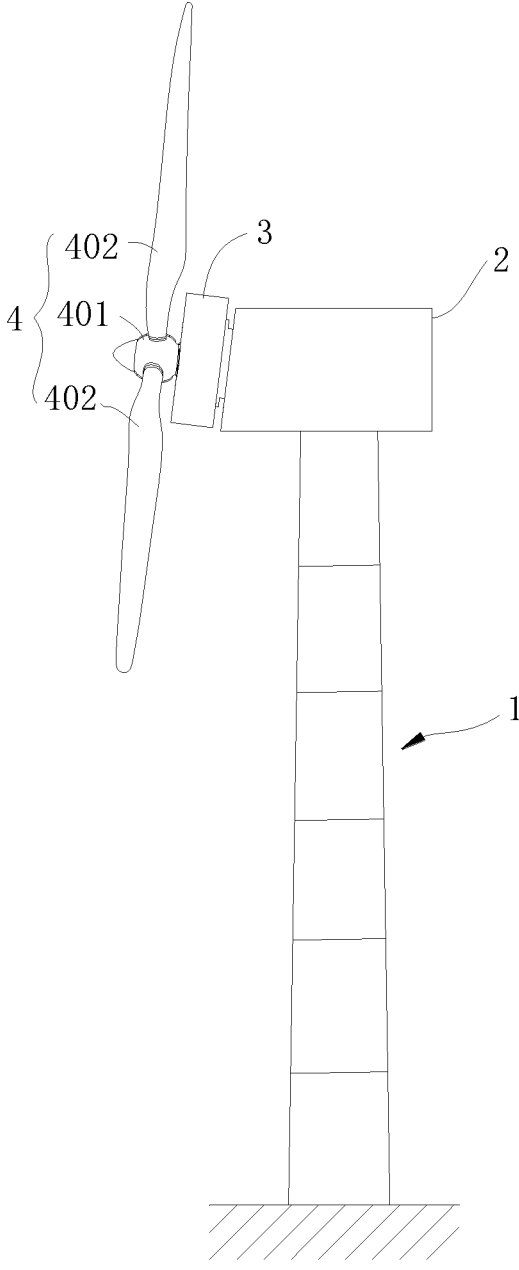
FIG. 1 is a schematic structural diagram of a wind turbine according to an embodiment of the present application.

In the figures:
1—tower;
100—tower drum section;
10—drum section base; 11—tower drum piece; 111—operation notch; 112—support surface;
20—connecting assembly; 21—first connecting member; 211—adapter portion; 211a—first adapter sleeve; 211b—second adapter sleeve; 212—anchoring portion; 212a—first end surface; 212b—second end surface; 212c—bent region;
22—second connecting member; 221—straight screw;

23—protective component; 231—protective sleeve; 232—reinforcing plate; 233—reinforcing rib;

30—connecting body;

2—nacelle; 3—generator; 4—impeller; 401—hub; 402—blade;

5—mold; 51—piece mold unit; 511—inner mold; 512—outer mold; 513—bottom mold; 52—vertical end mold; 521—avoidance hole;

53—pouring cavity; 54—protrusion;

X—circumferential direction; Y—height direction; H—maximum vertical distance; aa—curve trace; bb—broken line trace; cc—end surface in the circumferential direction.

In the drawings, the same reference numerals are used for the same components. The drawings are not drawn to actual scale.

DETAILED DESCRIPTION

The features and exemplary embodiments of various aspects of the present application will be described in detail below. In the following detailed description, many specific details are proposed in order to provide a comprehensive understanding of the present application. However, it is obvious to those skilled in the art that the present application may be implemented without some of these specific details. The following description of the embodiments is only to provide a better understanding of the present application by showing examples of the present application. In the drawings and the following description, at least part of the well-known structures and technologies are not shown in order to avoid unnecessary blurring of the present application; and, for clarity, the sizes of some structures may be exaggerated. Furthermore, the features, structures or characteristics described hereinafter may be combined in any suitable manner in one or more embodiments.

The directional terms appearing in the following description all refer to directions shown in the drawings, and are not intended to limit specific structures of a tower drum section, a tower, a wind turbine, a mold, and a forming method in the present application. In the description of the present application, it should also be noted that, unless otherwise clearly specified and defined, the terms "mounted" and "connected" should be broadly understood, for example, "connected" may be fixedly connected, detachably connected, integrally connected, directly connected, or indirectly connected. Those of ordinary skill in the art could understand the specific meanings of the above terms in the present application according to specific circumstances.

As shown in FIG. 1, an embodiment of the present application provides a wind turbine. The wind turbine includes a tower 1, a nacelle 2, a generator 3, and an impeller 4. The tower 1 is connected to a wind turbine foundation, the nacelle 2 is disposed at a top end of the tower 1, and the generator 3 is disposed in the nacelle 2. The generator 3 may be located outside the nacelle 2 to form a direct driven wind turbine. Alternatively, in some embodiments, the generator 3 may be located outside the nacelle 2 to form a double-fed wind turbine. The impeller 4 includes a hub 401 and a plurality of blades 402 connected to the hub 401, and the impeller 4 is connected to a rotor of the generator 3 through its hub 401. When wind acts on the blades 402, the entire impeller 4 and the rotor of the generator are driven to rotate, thereby meeting power generation requirements of the wind turbine.

Figure 2:
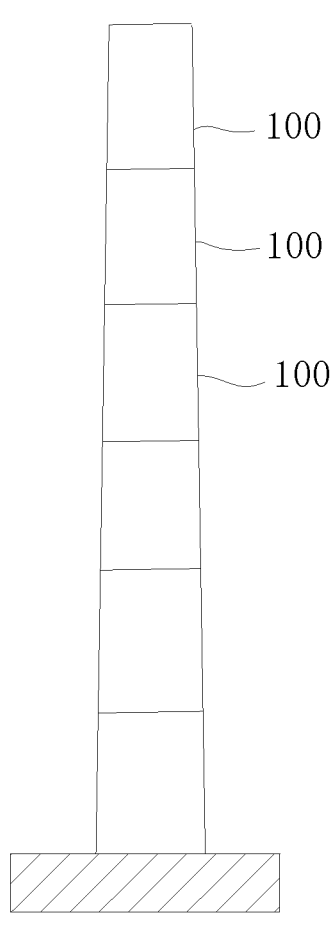
FIG. 2 is a schematic structural diagram of a tower according to an embodiment of the present application.

As shown in FIG. 2, an embodiment of the present application further provides a tower 1. The tower 1 includes two or more tower drum sections 100, the two or more tower drum sections 100 are disposed coaxially, and adjacent two tower drum sections 100 are connected to each other. The quantity of the tower drum sections 100 included in the tower 1 may be determined according to the model of the wind turbine and the height of a single tower drum section 100. The present application does not limit the specific quantity.

Because heavy devices such as the nacelle 2, the generator 3, and the impeller 4 of the wind turbine are all supported on the tower 1, the load-bearing capability of the tower 1 is highly required when the height or power of the wind turbine is relatively high. The tower 1 is required to have larger axial and radial dimensions. In order to meet the transportation requirements of the tower 1, at least some tower drum sections 100 of the tower 1 need to be divided into tower drum pieces 11. After being transported to a site, the tower drum pieces 11 are first spliced to form corresponding tower drum sections 100, and then the tower drum sections 100 are stacked to form the tower 1.

The tower drum pieces 11 of the tower drum sections 100 of the traditional tower 1 are spliced by "wet connection manner" with steel bars connection and pouring of high-strength grout. Such connection manner brings a lower connection strength between the tower drum pieces 11, and affects the safety performance of the tower drum sections 100.

An embodiment of the present application further provides a novel tower drum section 100. The tower drum section 100 is conducive to transportation and has high safety performance.

Figure 3:
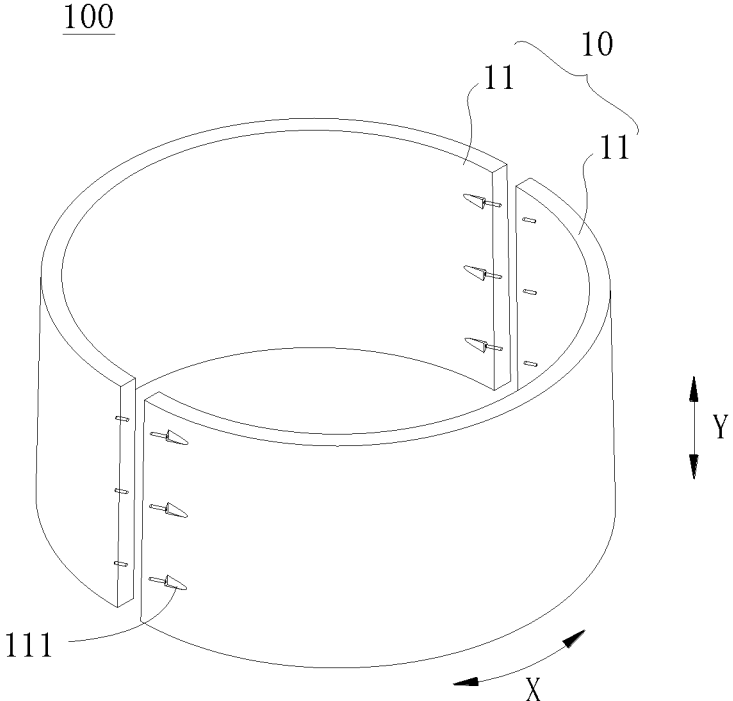
FIG. 3 is an explosive view of a tower drum section according to an embodiment of the present application.
Figure 4:
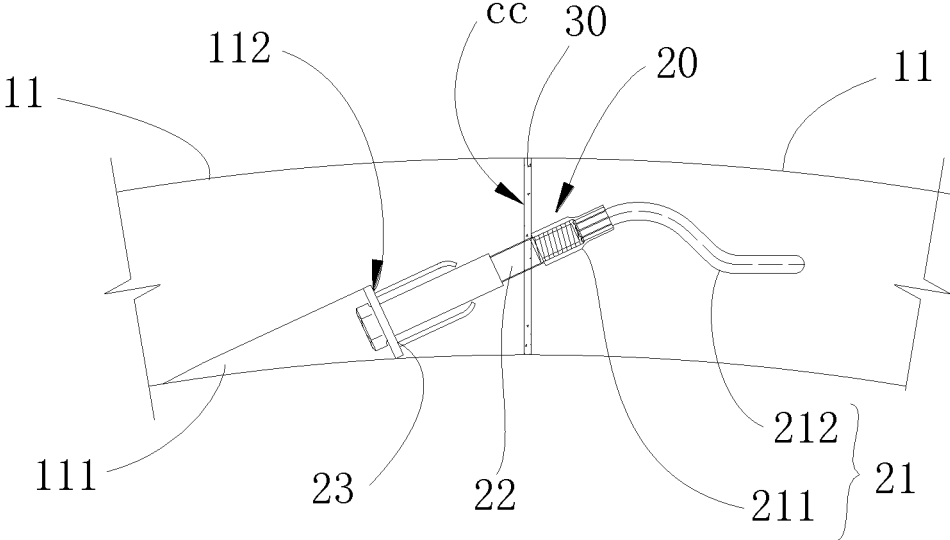
FIG. 4 is a schematic diagram of a partial structure of a tower drum section according to an embodiment of the present application.

As shown in FIG. 3 and FIG. 4, the tower drum section 100 includes a drum section base 10 and a connecting assembly 20. The drum section base 10 includes two or more tower drum pieces 11 successively distributed along its circumferential direction X. In the circumferential direction X of the drum section base 10, two adjacent tower drum pieces 11 are connected by means of the connecting assembly 20. The connecting assembly 20 includes a first connecting member 21 and a second connecting member 22. The first connecting member 21 is located inside one of the two adjacent tower drum pieces 11, and the second connecting member 22 is at least partially located inside the other of the two adjacent tower drum pieces 11. The first connecting member 21 includes an adapter portion 211 and an anchoring portion 212, the adapter portion 211 is connected to the second connecting member 22, and the anchoring portion 212 is connected to a side, facing away from the second connecting member 22, of the adapter portion 211.

The drum section base 10 of the tower drum section 100 provided in the embodiments of the present application includes two or more tower drum pieces 11, and the tower drum section 100 is formed in a split type, which can meet the transportation requirement for height limit and facilitate the transportation of the tower drum section 100. The connecting assembly 20 includes the first connecting member 21 and the second connecting member 22, the first connecting member 21 is located inside one of the two adjacent tower drum pieces 11, the second connecting member 22 is at least partially located inside the other of the two adjacent tower drum pieces 11, and the adapter portion 211 included in the first connecting member 21 is connected to the second connecting member 22, so that the two adjacent tower drum pieces 11 can be connected by means of the connecting assembly 20 to form the tower drum section 100. In addition, the first connecting member 21 further includes the anchoring portion 212, and the anchoring portion 212 is connected to the side, facing away from the second connecting member 22, of the adapter portion 211. By adding the anchoring portion 212, the connection area between the first connecting member 21 and the tower drum piece 11 can be increased, the connection strength between the first connecting member 21 and the tower drum piece 11 can be improved, and the connection strength between the two adjacent tower drum pieces 11 can then be ensured, thereby avoiding the risk of failure in the connection of the two adjacent tower drum pieces 11 due to the separation of the first connecting member 21 from the tower drum piece 11 where it is located, and improving the safety performance of the tower drum section 100.

As an optional implementation, a plurality of connecting assemblies 20 are provided and connected between the two adjacent tower drum pieces 11 of the tower drum section 100 provided in the embodiments of the present application, and the plurality of connecting assemblies 20 are spaced apart from each other in a height direction Y of the drum section base 10. By providing the plurality of connecting assemblies 20, the connection strength between the two adjacent tower drum pieces 11 can be ensured, thereby ensuring the safety performance of the tower drum section 100.

Figure 5:
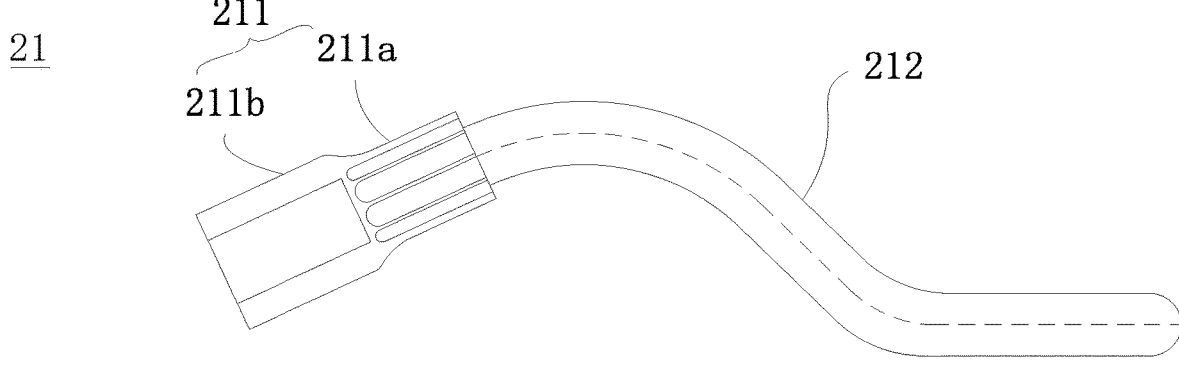
FIG. 5 is a schematic structural diagram of a first connecting member according to an embodiment of the present application.
Figure 6:
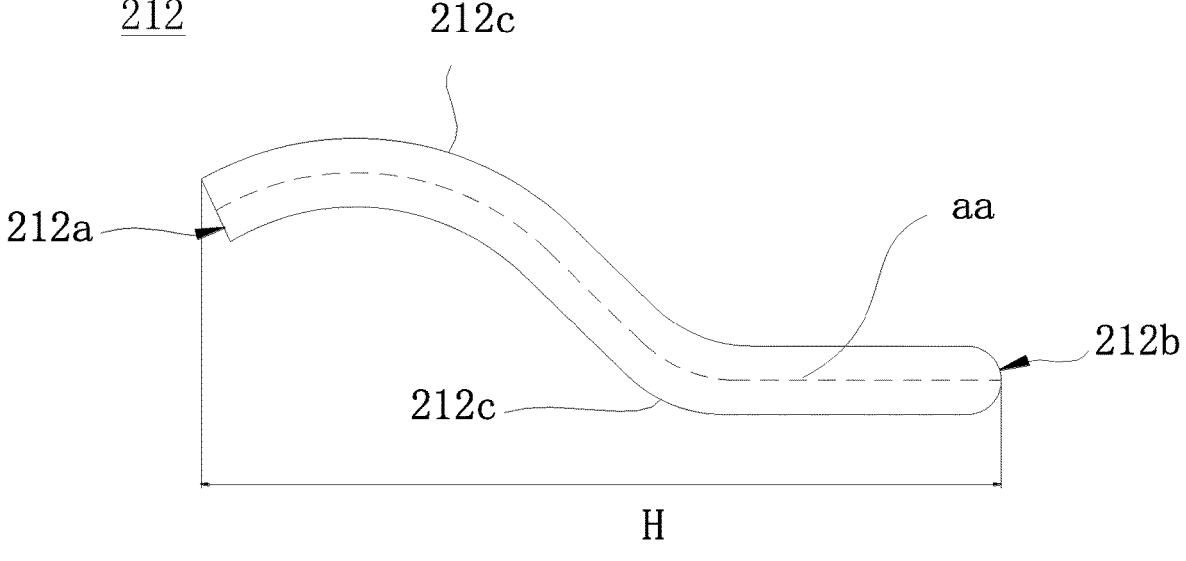
FIG. 6 is a schematic structural diagram of an anchoring portion according to an embodiment of the present application.

As shown in FIG. 5 and FIG. 6, as an optional implementation, in the tower drum section 100 provided in the embodiments of the present application, the anchoring portion 212 is formed in a rod-like shape and includes a first end surface 212a and a second end surface 212b in its extension direction, the first end surface 212a faces the adapter portion 211, and a maximum vertical distance H between the first end surface 212a and the second end surface 212b is smaller than a dimension of the anchoring portion 212 in length. By the above settings, the entire anchoring portion 212 can have a non-linear structure, which can further increase the contact and connection area between the anchoring portion 212 and the tower drum piece 11.

As an optional implementation, the anchoring portion 212 of the tower drum section 100 provided in the embodiments of the present application includes at least one bent region 212c, and the anchoring portion 212 extends at least partially along a curve trace aa. By the above settings, the contact and connection area between the anchoring portion 212 and the tower drum piece 11 can be increased, the connection strength between the second connecting member 22 and the tower drum piece 11 can be improved, and safety hazards to the entire tower drum section 100 due to the separation of the second connecting member 22 from the corresponding tower drum piece 11 under the action of the first connecting member 21 can be avoided.

Optionally, the anchoring portion 212 may be of a rod-shaped structure having at least one bent region 212c. The rod-shaped structure is conducive to the connection of the anchoring portion 212 with the corresponding tower drum piece 11, and can reduce the space occupied by the anchoring portion 212 and the impact of the anchoring portion 212 on the wall thickness of the tower drum piece 11.

Optionally, the bent region 212c of the anchoring portion 212 may be bent along a radial direction of the tower drum section 100. By the above setting, the entire anchoring portion 212 can extend along the circumferential direction X and include a plurality of bent regions 212c, which can increase the length of the anchoring portion 212 and prevent the length from being limited by the wall thickness of the tower drum piece 11 and ensure the connection reliability between the tower drum pieces 11 of the tower drum section 100 by the connecting assembly 20.

For example, the anchoring portion 212 may include two bent regions 212c, the two bent regions 212c can be bent along the radial direction, and the two bent regions 212c are bent in opposite directions, so as to improve the connection strength between the entire first connecting member 21 and the corresponding tower drum piece 11.

The anchoring portion 212 extends at least partially along the curve trace aa, which can be understood as a trace along which the moving direction of a moving point continuously changes.

It can be understood that it is only an optional implementation that two bent regions 212c are provided, and in some other embodiments, more than two bent regions 212c may be provided, and the specific quantity of the bent regions 212c is not limited.

As an optional implementation, the adapter portion 211 and the anchoring portion 212 may be detachably connected to each other. By the above setting, the formation of the adapter portion 211 can be facilitated. Meanwhile, the corresponding anchoring portion 212 can be provided according to the size of the tower drum section 100 to be formed and the connection strength requirements between two adjacent tower drum pieces 11, so that the connecting assembly 20 is more universal.

In some optional embodiments, one of the adapter portion 211 and the anchoring portion 212 may be inserted into the other and the two are detachably connected to each other, which can ensure the detachable connection requirements and connection strength between the two.

As an optional embodiment, the adapter portion 211 includes a first adapter sleeve 211a, and the anchoring portion 212 extends at least partially into the first adapter sleeve 211a and is threaded to the first adapter sleeve 211a. By the above settings, the detachable connection requirements between the adapter portion 211 and the anchoring portion 212 can be ensured, a good anti-detachment effect can be achieved, and the disassembly and assembly between the two are facilitated. It can be understood that, in some examples, the anchoring portion 212 can extend at least partially into the first adapter sleeve 211a and is connected to the first adapter sleeve 211a by squeezing, as long as the connection strength requirements between the two can be ensured.

It can be understood that the tower drum section 100 provided in the above embodiments of the present application is illustrated by the example that the anchoring portion 212 extends at least partially along the curve trace aa, which is an optional implementation.

Figure 7:
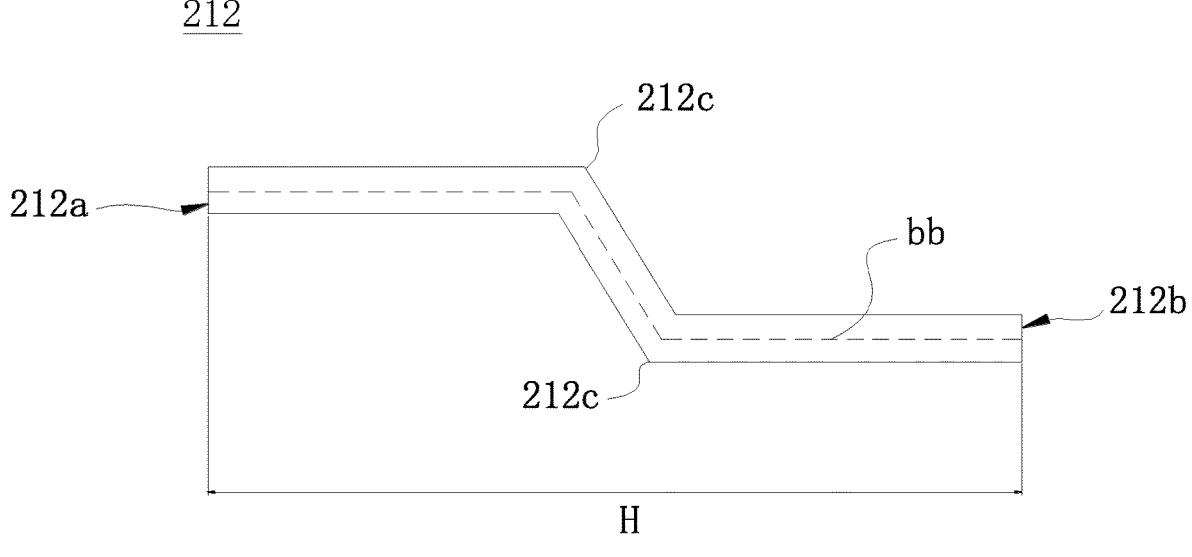
FIG. 7 is a schematic structural diagram of an anchoring portion according to another embodiment of the present application.

As shown in FIG. 7, in some embodiments, the anchoring portion 212 can extend at least partially along a broken line trace bb, which also can improve the connection strength between the entire first connecting member 21 and the tower drum piece 11 and ensure the stability of the tower drum section 100. The broken line trace bb can be understood as a zigzag line formed by connecting a plurality of line segments in sequence.

Figure 8:
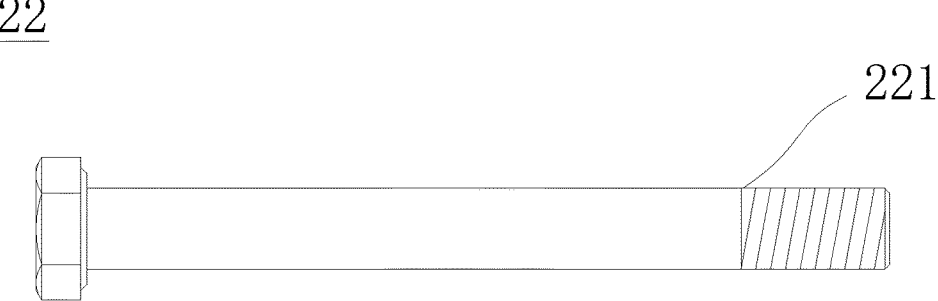
FIG. 8 is a schematic structural diagram of a second connecting member according to an embodiment of the present application.

As shown in FIG. 5 and FIG. 8, in some optional embodiments, the second connecting member 22 of the tower drum section 100 provided in the above embodiments of the present application includes a straight screw 221, the adapter portion 211 includes a second adapter sleeve 211b, and the straight screw 221 protrudes along its length direction out of the tower drum piece 11 and extends into the second adapter sleeve 211b for being threaded to the second adapter sleeve 211b.

The second connecting member 22 includes the straight screw 221, which not only can meet the connection requirements between the second connecting member 22 and the adapter portion 211, but also can improve the splicing efficiency when the tower drum pieces 11 are spliced. Moreover, the portion, for accommodating the straight screw 221, of the tower drum piece 11 is formed as a section with a straight hole, the structure is simple, which is conducive to the formation of the tower drum piece 11.

As shown in FIG. 4 to FIG. 8, in some optional embodiments, the tower drum piece 11 where the straight screw 221 is disposed, includes an operation notch 111 on its inner wall surface, the length direction of the straight screw 221 intersects an end surface cc in the circumferential direction X of the tower drum piece 11 where the straight screw 221 is located, the tower drum piece 11 is formed with a support surface 112 facing the end surface cc in the circumferential direction X at the operation notch 111, and the straight screw 221 is at least partially located within the operation notch 111 and presses against the support surface 112. By the above settings, the straight screw 221 can be exposed out of the inner wall surface of the tower drum piece 11, so that the straight screw 221 is pulled out or inserted through the tower drum piece 11 to facilitate the disassembly and assembly of the two adjacent tower drum pieces 11.

In some optional embodiments, the operation notch 111 may be a right-angled notch, and the extension direction of the straight screw 221 is perpendicular to the support surface 112. Through the above settings, the contact area between a head, which is in contact with the support surface 112, of the straight screw 221 and the support surface 112 can be increased, and the risk of cracking damage of the support surface 112 due to point contact between the straight screw 221 and the support surface 112 can be avoided.

Figure 9:
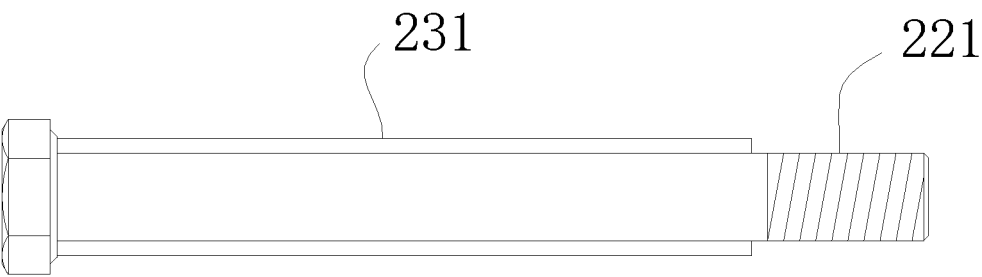
FIG. 9 is a schematic diagram of mating between a protective component and a second connecting member according to an embodiment of the present application.
Figure 10:
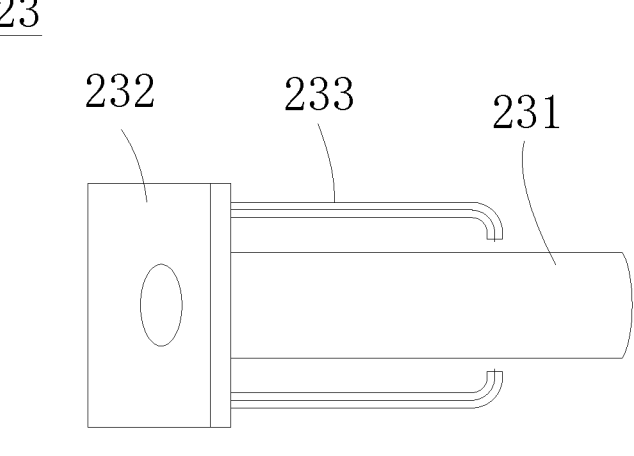
FIG. 10 is a schematic structural diagram of a protective component according to another embodiment of the present application.

As shown in FIG. 9 and FIG. 10, as an optional implementation, in the tower drum section 100 provided in the embodiments of the present application, the connecting assembly 20 further includes a protective component 23, which includes a protective sleeve 231, the protective sleeve 231 is at least partially located within the tower drum piece 11 where the second connecting member 22 is disposed, and the protective sleeve 231 is disposed surrounding the straight screw 221. By providing the protective sleeve 231, when the tower drum section 100 is formed, the straight screw 221 first passes through the protective sleeve 231, so that the straight screw 221 is isolated from the concrete used for forming the tower drum piece 11. After the initial solidification of the concrete, the straight screw 221 is pulled out to form an insertion hole for inserting the straight screw 221 inside the tower drum piece 11, so that when the tower drum pieces 11 are assembled to each other, the straight screw 221 can be inserted into the tower drum piece 11 and connected to the adapter portion 211 located in the other tower drum piece 11.

Optionally, the protective sleeve 231 may be a flexible rubber protective sleeve, as an optional implementation, but is not limited thereto. In some embodiments, the protective sleeve 231 may be a rigid sleeve.

Figure 11:
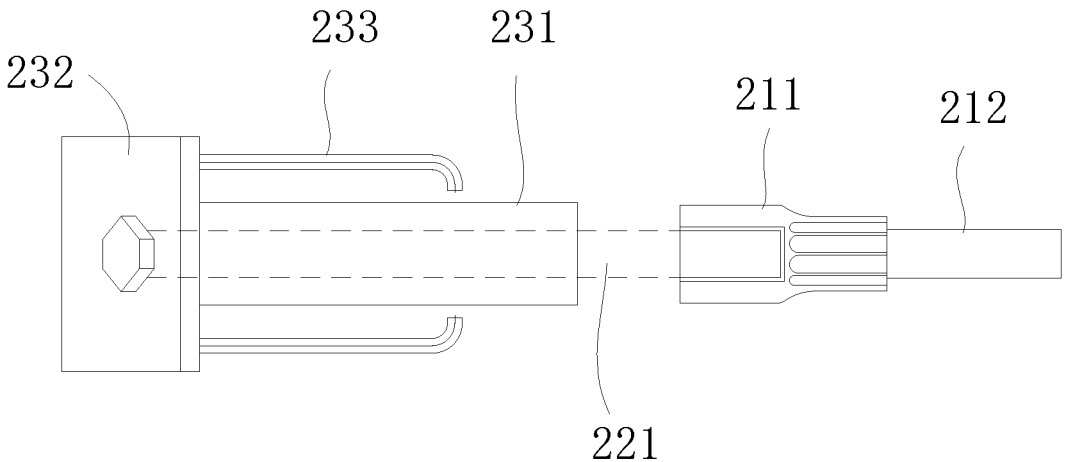
FIG. 11 is a schematic diagram of mating between a protective component and a second connecting member according to another embodiment of the present application.

As shown in FIG. 10 and FIG. 11, when the protective sleeve 231 is a rigid sleeve, in some optional embodiments, the protective component 23 may further include a reinforcing plate 232 and a plurality of reinforcing ribs 233, the reinforcing plate 232 is disposed at an end, facing away from the first connecting member 21, of the protective sleeve 231 in its axial direction and presses against the support surface 112, and the plurality of reinforcing ribs 233 are spaced apart from each other on an outer circumference of the protective sleeve 231 and connected to the reinforcing plate 232 respectively. By providing the reinforcing plate 232 and the reinforcing ribs 233, the strength of the tower drum piece 11 in the region around the protective sleeve 231 can be increased, and the protective effect on the straight screw 221 can be improved.

As an optional implementation, the joint of the two adjacent tower drum pieces 11 of the tower drum section 100 provided in the embodiments of the present application is filled with a connecting body 30, and the connecting body 30 is used for connecting the two adjacent tower drum pieces 11 to improve the overall strength of the tower drum section 100. The connecting body 30 has shear and bending resistance. In some optional embodiments, the connecting body 30 may include epoxy resin.

In the tower drum section 100 provided in the embodiments of the present application, two adjacent tower drum pieces 11 can be connected by means of the connecting assembly 20, and the first connecting member 21 further includes the anchoring portion 212. By adding the anchoring portion 212, the connection area between the first connecting member 21 and the tower drum piece 11 can be increased, the connection strength of the first connecting member 21 with the tower drum piece 11 can be improved, and the connection strength between the two adjacent tower drum pieces 11 can then be ensured, so as to avoid the risk of failure in the connection of the adjacent tower drum pieces 11 due to the separation of the first connecting member 21 from the tower drum piece 11, thereby improving the safety performance of the tower drum section 100.

Meanwhile, when the second connecting member 22 includes the straight screw 221, the connection manner between the first connecting member 21 and the second connecting member 22 of the tower drum section 100 provided in the embodiments of the present application can reduce standards for production accuracy of the tower drum section 100 compared to arc-shaped bolt connection manner, and effectively avoid the problem of failure in subsequent mounting due to uneven displacement, non-human movement, etc. of the first connecting member 21 and the second connecting member 22 of the connecting assembly 20 during production. The production of the tower drum section 100 does not need to adopt a quality controlled "factory" production plan.

Further, the tower 1 provided in the embodiments of the present application, which includes the tower drum section 100 provided in the above embodiments, is conducive to production, transportation and assembly and high in assembly efficiency and safety performance, and has high safety performance and power generation benefits in a wind turbine.

Figure 12:
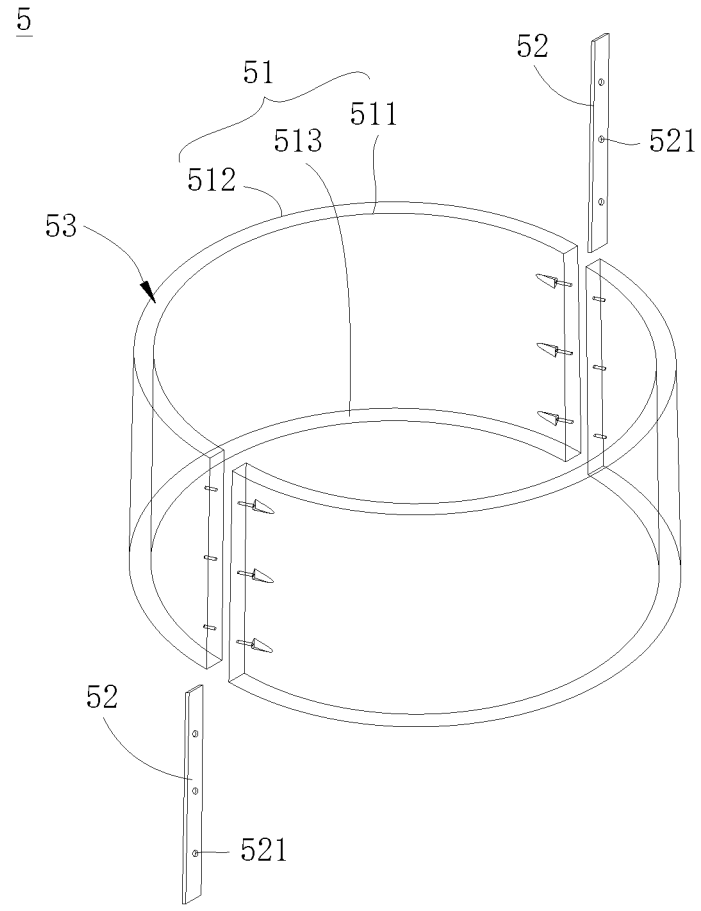
FIG. 12 is an explosive view of a mold according to an embodiment of the present application.
Figure 13:
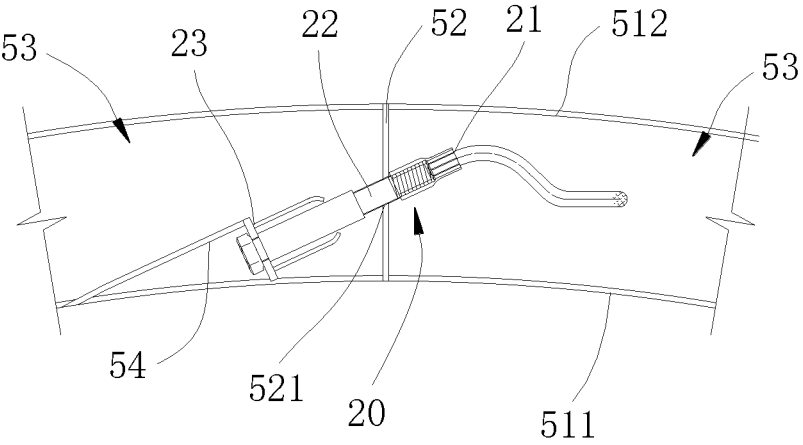
FIG. 13 is a schematic diagram of a partial structure of a mold according to an embodiment of the present application.

As shown in FIG. 12 and FIG. 13, in another aspect, an embodiment of the present application further provides a mold 5, which can be used for forming the tower drum section 100 provided in the above various embodiments. The mold 5 includes a mold base body and a connecting assembly 20. The mold base body includes two or more piece mold units 51 and vertical end molds 52, the two or more piece mold units 51 are spaced apart from each other around a same axis, and the vertical end molds 52 are held between two adjacent piece mold units 51. The piece mold unit 51 includes an inner mold 511 and an outer mold 512 opposite each other and a bottom mold 513, and the vertical end molds 52 are abutted against and connected with each piece mold unit 51 in the two adjacent piece mold units 51 to form pouring cavities 53. The connecting assembly 20 includes a first connecting member 21 and a second connecting member 22. The first connecting member 21 is located inside the pouring cavity 53 of one of the two adjacent piece mold units 51, and the second connecting member 22 is at least partially located inside the pouring cavity 53 of the other of the two adjacent piece mold units 51. The first connecting member 21 includes an adapter portion 211 and an anchoring portion 212, the second connecting member 22 passes through the vertical end mold 52 and is connected to the adapter portion 211, and the anchoring portion 212 is connected to a side, facing away from the second connecting member 22, of the adapter portion 211.

When the mold 5 provided in the embodiments of the present application is used, concrete may be poured into the pouring cavities 53 formed by the respective piece mold units 51 and the corresponding vertical end molds 52. After the concrete solidifies, one tower drum piece 11 is correspondingly formed in each pouring cavity 53. The first connecting member 21 and the second connecting member 22 may be retained in the correspondingly formed tower drum piece 11, so that two adjacent tower drum pieces 11 are connected by means of the connecting assembly 20 to form a tower drum section 100, the production requirements of the tower drum section 100 can be met, the procurement cost of the mold 5 can be effectively reduced, and the threshold for on-site construction operations can be lowered.

Moreover, during the forming process, the second connecting member 22 can be taken out before the concrete fully solidifies and after the insertion hole for inserting the second connecting member 22 has been formed. After the respective tower drum pieces 11 are transported to designated positions, the second connecting member 22 can be inserted into the insertion hole formed in the corresponding tower drum piece 11 and connected to the adapter portion 211 of the corresponding first connecting member 21, which is conducive to the formation of the tower drum section 100 and can ensure the transportation of the formed tower drum section 100 and the connection requirements of various tower drum pieces 11.

Meanwhile, the two adjacent piece mold units 51 form the pouring cavity 53 with the same vertical end mold 52, and the vertical end mold 52 is held among the bottom molds 513, the inner molds 511 and the outer molds 512; thus, contact between concave and convex portions of contact surfaces at a same cross-sectional position in a pouring stage is ensured and implementation of the assembly stage is facilitated. Such positioning mode allows a high meshing degree of curves between abutting surfaces of the two adjacent tower drum pieces 11 after forming. The requirement for the strength of the mold 5 is reduced, quick implementation in the assembly stage of the tower drum section 100 is ensured, and the working efficiency is improved.

As an optional implementation, the structural form of the first connecting member 21 and the second connecting member 22 of the connecting assembly 20 in the mold 5 provided in the embodiments of the present application may be the structural form thereof in the tower drum section 100 in the above embodiments, and will not be repeated here.

As an optional implementation, the connecting assembly 20 of the mold 5 provided in the embodiments of the present application may further include a protective component 23, and the protective component 23 may include a protective sleeve 231. Further, the protective component 23 may further include a reinforcing plate 232 and reinforcing ribs 233. The structural form of the protective sleeve 231, the structural form of the reinforcing plate 232, the structural form of the reinforcing ribs 233, and their matching relationship may be the same as those in the tower drum section 100 in the above embodiments, and will not be repeated here.

Quantity of the piece mold units 51 and that of the vertical end molds 52 in the mold 5 provided in the embodiments of the present application are not specifically limited, and can be set according to the quantity of tower drum pieces 11 to be formed.

As an optional implementation, the inner mold 511 of the piece mold unit 51 where the second connecting member 22 is disposed, includes a protrusion 54 protruding in the direction of the outer mold 512, and the second connecting member 22 extends at least partially into the protrusion 54. By providing the protrusion 54, an operation notch 111 can be formed at a corresponding position of the formed tower drum piece 11. The structural form of the formed operation notch 111 is the same as that in the tower drum section 100 as described in the above embodiments, which facilitates the disassembly and assembly of the second connecting member 22 in the process of forming the tower drum piece 11 and after the forming of the tower drum piece 11.

Optionally, the vertical end mold 52 is provided with an avoidance hole 521 through which the second connecting member 22 passes.

Figure 14:
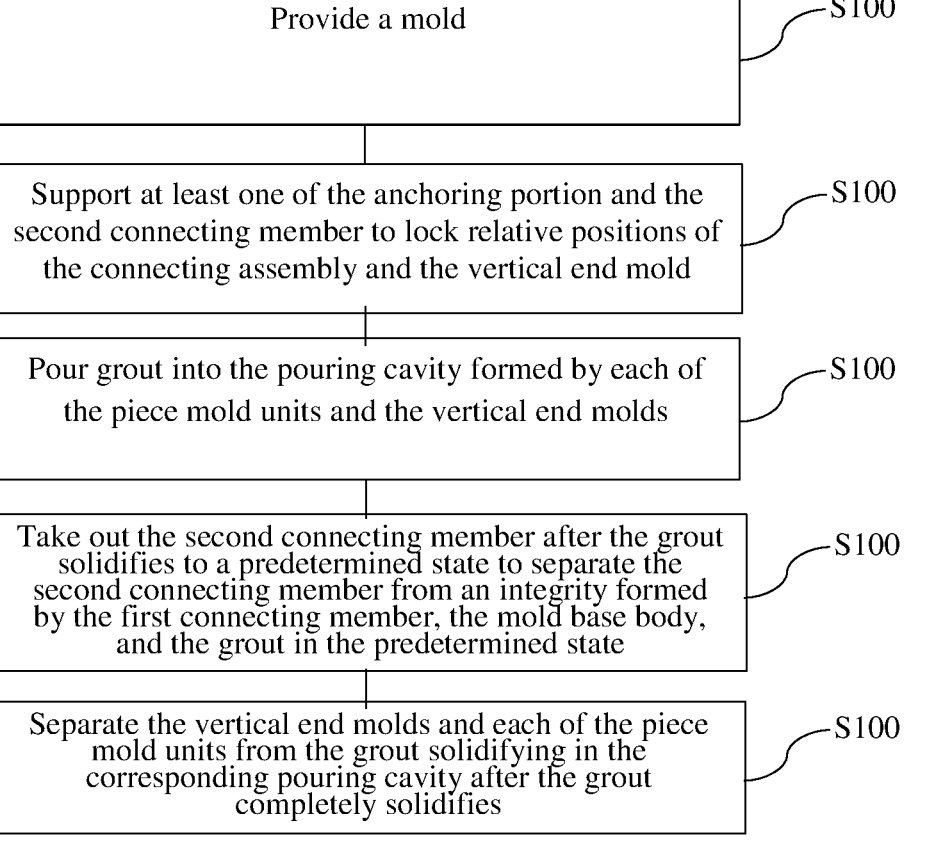
FIG. 14 is a schematic flowchart of a method for forming a tower drum section according to an embodiment of the present application.

As shown in FIG. 14, in still another aspect, an embodiment of the present application further provides a method for forming a tower drum section 100, including the following steps:

S100, providing a mold 5, where the mold 5 may be one of the above embodiments;

S200, supporting at least one of the anchoring portion 212 and the second connecting member 22 to lock relative positions of the connecting assembly 20 and the vertical end mold 52;

S300, pouring grout into the pouring cavities 53 formed by the respective piece mold units 51 and the vertical end molds 52;

S400, taking out the second connecting member 22 after the grout solidifies to a predetermined state, to separate the second connecting member 22 from an integrity formed by the first connecting member 21, the mold base body, and the grout in the predetermined state;

S500, separating the vertical end molds 52 and the respective piece mold units 51 from the grout solidifying in the corresponding pouring cavities 53 after the grout completely solidifies.

In the step S100, the provided mold 5 may be one of the molds 5 mentioned in the above embodiments.

In the step S200, it is available to support merely the anchoring portion 212, support merely the second connecting member 22, or support both the anchoring portion 212 and the second connecting member 22, to lock the relative positions of the connecting assembly 20 and the vertical end mold 52 and avoid falling or flipping of the connecting assembly 20 in the process of pouring the concrete.

Optionally, when supporting the anchoring portion 212, steel bars or pre-stressed bars may be disposed inside the pouring cavity 53 to support the anchoring portion 212.

Optionally, when supporting the second connecting member 22, a protrusion 54 protruding in the direction of the outer mold 512 may be disposed on the inner mold 511 of the piece mold unit 51 where the second connecting member 22 is located, and the second connecting member 22 at least partially extends into the protrusion 54 to be supported.

Optionally, in the step S300, the grout poured in the pouring cavity 53 may be concrete grout, or other grout that can solidify to form tower drum pieces 11 having predetermined strength.

Optionally, in the step S400, the mentioned predetermined state is a state after initial solidification and before final solidification of the concrete, which not only can ensure the separation of the second connecting member 22 from the concrete, but also can ensure that the concrete in the corresponding region will not collapse after the second connecting member 22 is pulled out, and that a mating region matching with the second connecting member 22 in shape can be retained.

Optionally, in the step S500, the tower drum pieces 11 of the formed tower drum section are separated for easy transportation, and after the tower drum pieces 11 are transported to the predetermined positions, the respective second connecting members 22 can be inserted into the corresponding tower drum piece 11 and connected to the adapter portions 211 of the first connecting members 21 in the other tower drum piece 11.

As an optional implementation, the method for forming the tower drum section 100 provided in the embodiments of the present application further includes a step of screwing the second connecting member 22 according to a predetermined speed after the step S300 and before the step S400, so as to prevent the second connecting member 22 from being fixed when the grout solidifies and failing in being pulled out. The specific speed of screwing is not numerically limited, as long as the second connecting member 22 can be prevented from being fixed when the grout solidifies.

Optionally, in the step S500, after the grout completely solidifies, two or more tower drum pieces 11 are formed after the vertical end molds 52 and the respective piece mold units 51 are separated from the grout solidifying in the corresponding pouring cavities 53.

Optionally, after the step S500, the method provided in the embodiments of the present application further includes a step of inserting the second connecting member 22 into the tower drum piece 11 and connecting the tower drum piece 11 to the first connecting member 21, so as to connect two adjacent tower drum pieces 11.

Optionally, after the step S500, the method provided in the embodiments of the present application further includes a step of filling grout into a space between the two adjacent tower drum pieces 11 to form a connecting body 30 after the grout solidifies, where the connecting body 30 is used for connecting the two adjacent tower drum pieces 11.

The grout filled between the two adjacent tower drum pieces 11 may be different from that poured into the pouring cavities 53 in the step S300. The grout filled between the two adjacent tower drum pieces 11 may be an adhesive having tensile and shear strength. In some optional examples, the adhesive may be a high-strength epoxy adhesive. This is an optional example, but the adhesive is not limited thereto, as long as the solidified connecting body 30 meets the bonding strength requirement between two adjacent tower drum pieces 11.

The method for forming the tower drum section 100, provided in the embodiments of the present application, can form the tower drum section 100 provided in the above embodiments by performing the steps S100 to S500. The forming method is simple and is not limited by the workshop, and two adjacent tower drum pieces 11 of the formed tower drum section 100 can be connected by means of the connecting assembly 20, with high connection strength. Meanwhile, a meshing degree of curves between abutting surfaces of the two adjacent tower drum pieces 11 is high. When assembled after transported to a site, the second connecting member 22 can extend into the corresponding tower drum piece 11 and be connected to the adapter portion 211 of the first connecting member 21 for disassembly, assembly, and transportation.

Although the present application is described with reference to the preferred embodiments, various improvements can be made and components therein can be replaced by equivalents without departing from the scope of the present application. In particular, as long as there is no structural conflict, various technical features mentioned in the embodiments can be combined in any way. The present application is not limited to the specific embodiments disclosed herein, but includes all technical solutions falling within the scope of the claims.

The invention claimed is:

1. A tower drum section, comprising:
   a drum section base, comprising two or more tower drum pieces successively distributed along a circumferential direction of the drum section base; and
   a connecting assembly, wherein in the circumferential direction, two adjacent tower drum pieces are connected by the connecting assembly, the connecting assembly comprises a first connecting member and a second connecting member, the first connecting member comprises an adapter portion and an anchoring portion that are located inside a first one of the two adjacent tower drum pieces, the second connecting member is at least partially located inside a second one of the two adjacent tower drum pieces, the adapter portion is connected to the second connecting member, and the anchoring portion is connected to the adapter portion on a first side of the adapter portion facing away from the second connecting member,
   wherein the adapter portion comprises a first adapter sleeve and a second adapter sleeve,
   wherein the anchor portion on the first side of the adapter portion extends at least partially into the first adapter sleeve through an end of the first adapter sleeve, and
   wherein the first adapter sleeve is connected to the second adapter sleeve, and the second connecting member on a second side of the adapter portion extends into the second adapter sleeve through an end of the second adapter sleeve that is away from the first adapter sleeve.

2. The tower drum section according to claim 1, wherein the anchoring portion is formed in a rod-like shape and comprises a first end surface and a second end surface in an extension direction of the anchoring portion, the first end surface is disposed facing the adapter portion, and a maximum vertical distance between the first end surface and the second end surface is smaller than a dimension of the anchoring portion in length.

3. The tower drum section according to claim 2, wherein the anchoring portion comprises at least one bent region; and
   the anchoring portion extends at least partially along a curve trace, or the anchoring portion extends at least partially along a broken line trace.

4. The tower drum section according to claim 2, wherein the anchoring portion comprises at least one bent region; and
   the anchoring portion extends at least partially along a curve trace, and the anchoring portion extends at least partially along a broken line trace.

5. The tower drum section according to claim 1, wherein the adapter portion and the anchoring portion are detachably connected to each other.

6. The tower drum section according to claim 1, wherein the anchoring portion is threaded to the first adapter sleeve.

7. The tower drum section according to claim 1, wherein the second connecting member comprises a straight screw, and the straight screw protrudes along a length direction of the straight screw out of the second one of the two adjacent tower drum pieces and extends into the second adapter sleeve for being threaded to the second adapter sleeve.

8. The tower drum section according to claim 7, wherein the second one of the two adjacent tower drum pieces where the straight screw is disposed comprises an inner wall surface and an operation notch at the inner wall surface, the length direction of the straight screw intersects an end surface in the circumferential direction of the second one of the two adjacent tower drum pieces where the straight screw is located, the second one of the two adjacent tower drum pieces is formed with a support surface facing the end surface at the operation notch, and the straight screw is at least partially located within the operation notch and presses against the support surface.

9. The tower drum section according to claim 7, wherein the connecting assembly further comprises a protective component which comprises a protective sleeve, the protective sleeve is at least partially located within the second one of the two adjacent tower drum pieces where the second connecting member is disposed, and the protective sleeve is disposed surrounding the straight screw.

10. The tower drum section according to claim 9, wherein the protective component further comprises a reinforcing plate and a plurality of reinforcing ribs, the reinforcing plate is disposed at an end of the protective sleeve facing away from the first connecting member in an axial direction and presses against the support surface, and the plurality of reinforcing ribs are spaced apart from each other on an outer circumference of the protective sleeve and connected to the reinforcing plate respectively.

11. The tower drum section according to claim 1, wherein a plurality of connecting assemblies are provided and connected between the two adjacent tower drum pieces, and the plurality of connecting assemblies are spaced apart from each other in a height direction of the drum section base.

12. A tower, comprising:

two or more tower drum sections, wherein the two or more tower drum sections are disposed coaxially, and each two adjacent tower drum sections of the two or more tower drum sections are connected to each other, wherein each tower drum section comprises:

a drum section base, comprising two or more tower drum pieces successively distributed along a circumferential direction of the drum section base; and a connecting assembly, wherein in the circumferential direction, two adjacent tower drum pieces are connected by the connecting assembly, wherein the connecting assembly comprises a first connecting member and a second connecting member, the first connecting member comprises an adapter portion and an anchoring portion that are located inside a first one of the two adjacent tower drum pieces, and the second connecting member is at least partially located inside a second one of the two adjacent tower drum pieces, wherein the adapter portion is connected to the second connecting member, and the anchoring portion is connected to the adapter portion on a first side of the adapter portion facing away from the second connecting member, wherein the adapter portion comprises a first adapter sleeve and a second adapter sleeve, wherein the anchor portion on the first side of the adapter portion extends at least partially into the first adapter sleeve through an end of the first adapter sleeve, and wherein the first adapter sleeve is connected to the second adapter sleeve, and the second connecting member on a second side of the adapter portion extends into the second adapter sleeve through an end of the second adapter sleeve that is away from the first adapter sleeve.

13. The tower according to claim 12, wherein the anchoring portion is formed in a rod-like shape and comprises a first end surface and a second end surface in an extension direction of the anchoring portion, the first end surface is disposed facing the adapter portion, and a maximum vertical distance between the first end surface and the second end surface is smaller than a dimension of the anchoring portion in length.

14. The tower according to claim 13, wherein the anchoring portion comprises at least one bent region; and the anchoring portion extends at least partially along a curve trace, or the anchoring portion extends at least partially along a broken line trace.

15. The tower according to claim 12, wherein the adapter portion and the anchoring portion are detachably connected to each other.

16. The tower according to claim 15, wherein the anchoring portion is threaded to the first adapter sleeve.

17. The tower according to claim 12, wherein the second connecting member comprises a straight screw, and the straight screw protrudes along a length direction of the straight screw out of the second one of the two adjacent tower drum pieces and extends into the second adapter sleeve for being threaded to the second adapter sleeve.

18. The tower according to claim 17, wherein the second one of the two adjacent tower drum pieces where the straight screw is disposed comprises an inner wall surface and an operation notch at the inner wall surface, the length direction of the straight screw intersects an end surface in the circumferential direction of the second one of the two adjacent tower drum pieces where the straight screw is located, the second one of the two adjacent tower drum pieces is formed with a support surface facing the end surface at the operation notch, and the straight screw is at least partially located within the operation notch and presses against the support surface.

19. The tower according to claim 17, wherein the connecting assembly further comprises a protective component which comprises a protective sleeve, the protective sleeve is at least partially located within the second one of the two adjacent tower drum pieces where the second connecting member is disposed, and the protective sleeve is disposed surrounding the straight screw.

20. A wind turbine, comprising:

a generator; and a tower, wherein the generator is disposed on the tower, wherein the tower comprises:

two or more tower drum sections, wherein the two or more tower drum sections are disposed coaxially, and each two adjacent tower drum sections of the two or more tower drum sections are connected to each other, wherein each tower drum section comprises:

a drum section base, comprising two or more tower drum pieces successively distributed along a circumferential direction of the drum section base; and a connecting assembly, wherein in the circumferential direction, two adjacent tower drum pieces are connected by the connecting assembly, wherein the connecting assembly comprises a first connecting member and a second connecting member, the first connecting member comprises an adapter portion and an anchoring portion that are located inside a first one of the two adjacent tower drum pieces, and the second connecting member is at least partially located inside a second one of the two adjacent tower drum pieces, wherein the adapter portion is connected to the second connecting member, and the anchoring portion is connected to the adapter portion on a first side of the adapter portion facing away from the second connecting member, wherein the adapter portion comprises a first adapter sleeve and a second adapter sleeve, wherein the anchor portion on the first side of the adapter portion extends at least partially into the first adapter sleeve through an end of the first adapter sleeve, and wherein the first adapter sleeve is connected to the second adapter sleeve, and the second connecting member on a second side of the adapter portion extends into the second adapter sleeve through an end of the second adapter sleeve that is away from the first adapter sleeve.

* * * * *